United States Patent [19]

Weinstein

[11] Patent Number: 4,766,369
[45] Date of Patent: Aug. 23, 1988

[54] ICE DETECTOR

[75] Inventor: Leonard M. Weinstein, Newport News, Va.

[73] Assignee: The United States of America as represented by the Administrator of the National Aeronautics and Space Administration, Washington, D.C.

[21] Appl. No.: 54,980

[22] Filed: May 28, 1987

Related U.S. Application Data

[63] Continuation-in-part of Ser. No. 846,429, Mar. 31, 1986, abandoned.

[51] Int. Cl.⁴ .............................................. G01R 27/26
[52] U.S. Cl. ............................... 324/61 R; 244/134 F; 340/580
[58] Field of Search ......................... 324/61 R, 57 R; 244/134 F, 134 R, 134 E; 73/336; 340/580, 602

[56] References Cited

U.S. PATENT DOCUMENTS

| 3,873,927 | 3/1975 | Overall | 324/61 R X |
| 3,882,381 | 5/1975 | Gregory | 324/61 R |
| 3,986,110 | 10/1976 | Overall et al. | 324/61 P X |
| 4,282,480 | 8/1981 | Fujito et al. | 324/60 CD X |

Primary Examiner—Reinhard J. Eisenzopf
Assistant Examiner—Robert W. Mueller
Attorney, Agent, or Firm—George F. Helfrich; John R. Manning

[57] ABSTRACT

An ice detector 11 is provided for the determination of the thickness of ice 22 on the outer surface 12 on an object (e.g., aircraft 10) independently of temperature or the composition of the ice 22. First capacitive gauge 16, second capacitive gauge 18, and temperature gauge 20 are embedded in embedding material 14 located within a hollowed out portion of outer surface 12. This embedding material 14 is flushed with outer surface 12 to prevent undesirable drag. First capacitive gauge 16, second capacitive gauge 18, and temperature gauge 20 are respectively connected to first capacitance measuring circuit 24, second capacitance measuring circuit 26, and temperature measuring circuit 28. The geometry of first and second capacitive gauges 16 and 18 is such that the ratio of the voltage outputs of first and second capacitance measuring circuits 24 and 26 is proportional to the thickness of ice 22, regardless of ice temperature or composition. This ratio is determined by offset and dividing circuit 29.

8 Claims, 3 Drawing Sheets

ICE DETECTOR

ORIGIN OF THE INVENTION

The invention described herein was made by an employee of the U.S. Government and may be manufactured and used by or for the Government for governmental purposes without the payment of any royalties thereon or therefor.

CROSS-REFERENCE TO RELATED APPLICATION

This application is a continuation-in-part of co-pending application, Ser. No. 846,429, filed March 31, 1986, now abandoned.

TECHNICAL FIELD OF THE INVENTION

This invention relates generally to an ice detector, and more particularly to an electronic ice detector for detecting and measuring ice on the outside of an aircraft.

BACKGROUND OF THE INVENTION

Since the accumulation of ice on the various surfaces of an aircraft can produce disastrous results, it is important for the pilot to know when ice starts to appear and how thick the layer is. This knowledge allows the pilot to take measures to remove the ice, such as turning on surface heaters or changing the flight speed or elevation. While various attempts have been made to produce ice detectors, they have been limited by their accuracy, by their inability to distinguish between ice and water, and by their inability to measure the thickness of the ice.

One such prior art device shown in U.S. Pat. No. 3,247,478 includes two electrodes shaped like interleaved comb-like grids. When the relative humidity changes, the resistance of the device changes. Thus, by measuring the resistance, the relative humidity may be determined. However, this device does not measure the thickness of ice, nor does it distinguish between ice and water.

In U.S. Pat. No. 3,422,677, a device is shown where ice is detected by having a combination of a humidity detecting circuit and a temperature measuring circuit. When the device senses the presence of moisture and a temperature below the freezing point the presence of ice is indicated. When ice is detected, a heater may be actuated to remove it. While this device is designed to detect the presence of ice, it does not allow for a measurement of the thickness of the ice. It also requires several different temperature transducers in order to detect the ice.

Other previous methods used to detect ice and determine its thickness include visual observation, ultrasonic vibrating sensing probes and probes with optical sensors. These methods are not very accurate in either detection or thickness determination. Also, visual observation can only be used for detection and is severely limited by darkness or other poor visibility conditions. The other methods using probes are complex and the protruding probes cause undesirable drag.

Accordingly, it is an object of this invention to provide a device which accurately detects the presence of ice on a surface.

It is a further object of this invention to provide a device which accurately determines the thickness of ice on a surface.

It is a further object of this invention to accomplish the foregoing objects simply and cheaply.

It is a further object of this invention to accomplish the foregoing objects without causing undesirable drag as the surface moves through a viscous medium.

It is a further object of the invention to accomplish the foregoing objects independently of darkness or other poor visibility conditions.

Other objects and advantages of this invention will become apparent hereinafter in the specification and drawings which follow.

SUMMARY OF THE INVENTION

According to the present invention, the foregoing and additional objects are obtained by providing an ice detector which comprises two capacitive gauges of different configurations and a temperature gauge which are flush mounted on the surface of interest. The temperature gauge determines when a freezing condition is present. If it is freezing, the capacitive gauges are activated and indicate the presence of ice due to the change in the dielectric constant for the gauges. Each gauge responds to a combination of ice thickness and ice properties (temperature, composition). The effect of ice properties is a common scaling factor for both gauges. With a suitable choice of gauge geometries, the ratio of the outputs of the two gauges is only a function of ice thickness, and is independent of ice properties. Since the three gauges are flush mounted, no undesirable drag results.

DETAILED DESCRIPTION OF THE INVENTION

Figure 1:
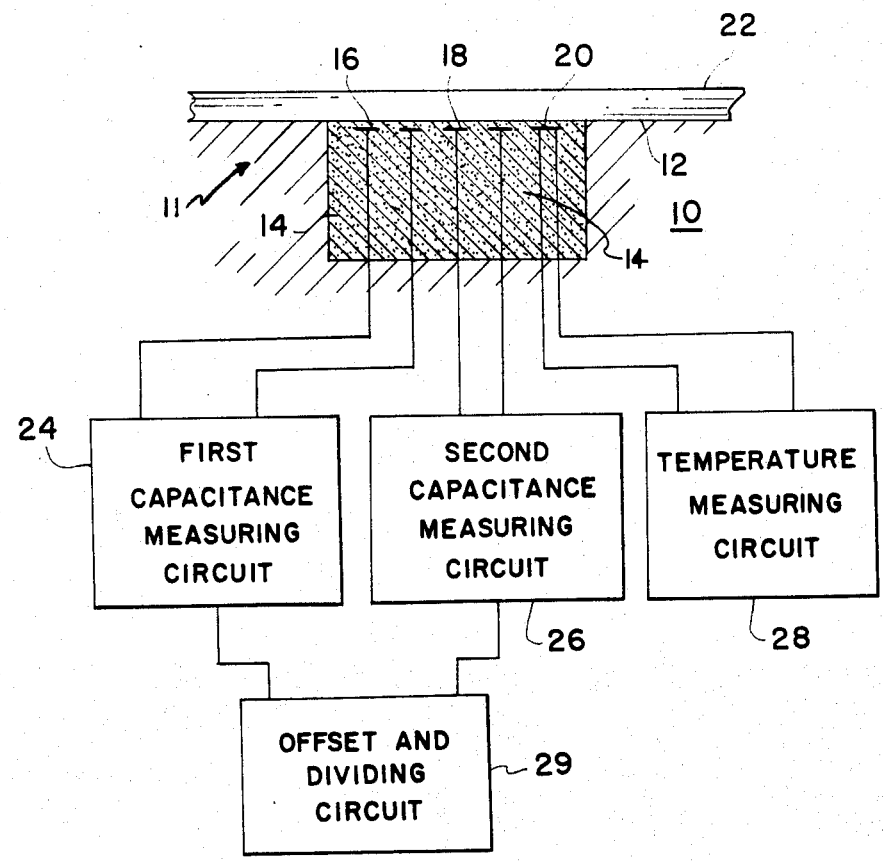
FIG. 1 is a schematic diagram showing the relative locations of the various sensors on the surface of interest.

As illustrated in FIG. 1, ice detector 11 is comprised of a first capacitive gauge 16, a second capacitive gauge 18, and a temperature measuring gauge 20. The ice detector 11 is mounted near the outer surface 12 of aircraft 10. This outer surface 12 may be on the wing, the engine intake, or any other surface of aircraft 10 where the formation of ice is detrimental. A small section of the outer surface 12 is removed and replaced with embedding material 14, which preferably is either plastic or an epoxy-type material. The ice detector 11 is embedded in this embedding material 14 slightly below the outer surface 12. The distance of the ice detector 11 from the outer surface 12 need only be close enough to accurately sense the presence of any material on the outer surface 12. The embedding material 14 is then flushed with outer surface 12 to ensure no undesirable drag.

First capacitive gauge 16, second capacitive gauge 18 and temperature gauge 20 are connected respectively to first capacitance measuring circuit 24, second capacitance measuring circuit 26, and temperature measuring circuit 28. The outputs of first and second capacitance measuring circuits 24 and 26 are connected to an offset and dividing circuit 29.

The temperature gauge 20 may be any one of several standard temperature sensors, such as a resistance film sensor, a thermocouple or an integrated circuit temperature sensor. The temperature measuring circuit 28 receives the output of the temperature sensor and determines thereby the temperature and whether it is below the freezing point. The particulars of the circuit depend on which temperature sensor is used. Such circuits are well known in the art for each type of sensor.

Figures 2, 3:
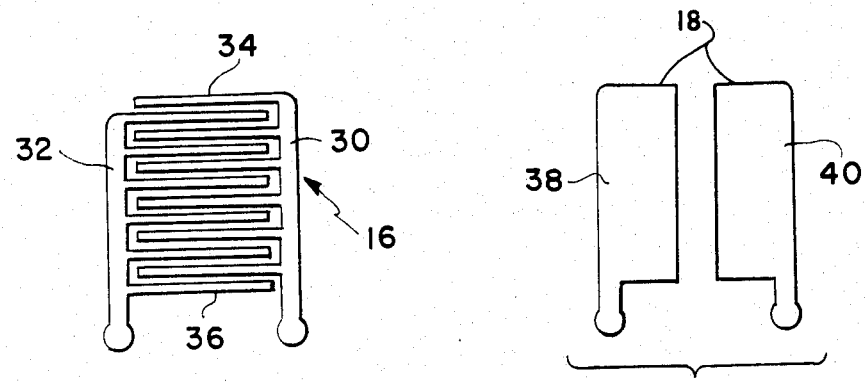
FIG. 2 is a schematic diagram of a first capacitive gauge.
FIG. 3 is a schematic diagram of a second capacitive gauge.

Referring now to FIG. 2, first capacitance gauge 16 is shown. Opposite sides of the first capacitive gauge 16 are formed from the parallel leads 30 and 32. Each of the two leads has connected respectively thereto a series of interleaved electrodes 34 and 36. The electrodes 34 and 36 are perpendicular to the leads 30 and 32 and parallel to each other. The electrodes 34 and 36 do not touch each other and hence the presence of a material in the vicinity of the electrodes 34 and 36 causes a change in capacitance between the electrodes 34 and 36. While the dimensions of the first capacitive gauge 16 may vary, preferably the distance between the outside edges of the leads 30 and 32 is approximately ¾ of an inch. Likewise, the length of the leads 30 and 32 which contain the connections to the electrodes 34 and 36 is about ¼ of an inch. Preferably, the electrodes 34 and 36 are approximately 0.014 inches wide and have gaps of approximately 0.012 of an inch between them.

Referring now to FIG. 3, second capacitive gauge 18 is shown. This second capacitive gauge 18 consists of two leads 38 and 40 which are parallel to each other. While the dimensions of the second capacitive gauge 18 may vary, preferably the distance between the outside edges at the leads 38 and 40 is approximately two inches. The parallel leads 38 and 40 each are formed from a single electrode which covers almost one-third of the distance between the outer edges of these leads 38 and 40. This distance is preferably approximately 0.67 of an inch. The length of this single electrode is approximately two inches.

Both first capacitive gauge 16 and second capacitive gauge 18 are made from thin conductors with a thickness of approximately 0.001 of an inch.

Figure 4:
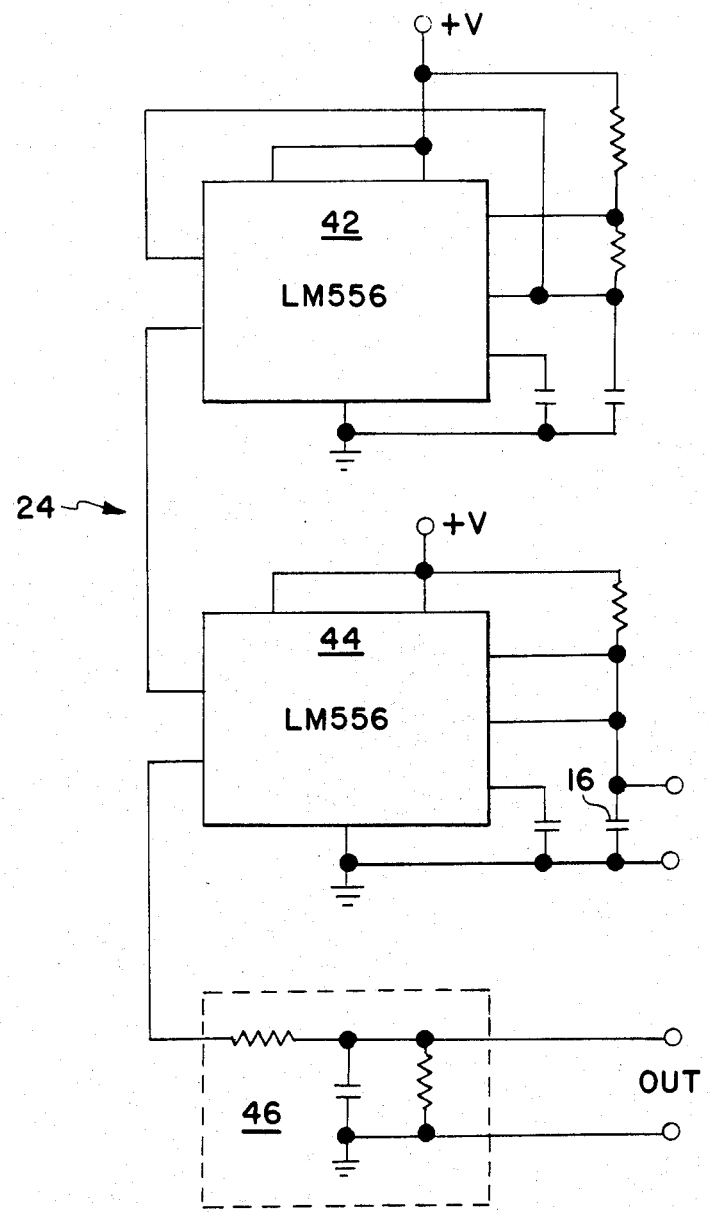
FIG. 4 is an electrical schematic diagram of one of the capacitance measuring circuits used in conjunction with the capacitive gauges.

Referring once again to FIG. 1, first capacitive gauge 16 is connected to first capacitance measuring circuit 24 and second capacitive gauge 18 is connected to second capacitance measuring circuit 26. The first capacitance measuring circuit 24 is identical to second capacitance measuring circuit 26. Referring now to FIG. 4, first capacitance measuring circuit 24 is shown. A dual timer LM556, which is a commonly used circuit and available from several sources, such as National Semiconductor Corporation, is used. One of the timers, 42, is used in an astable mode to generate 7μs pulses at 1.5 kHz, for example, or pulses at any other similar frequencies, which are used to trigger a monostable timer 44. The timing capacitor of monostable timer 44 is the gauge 16. The output from the monostable timer is converted by the low pass filter 46 to produce an output DC signal which is directly proportional to the capacitance of first capacitive gauge 16.

Figure 5:
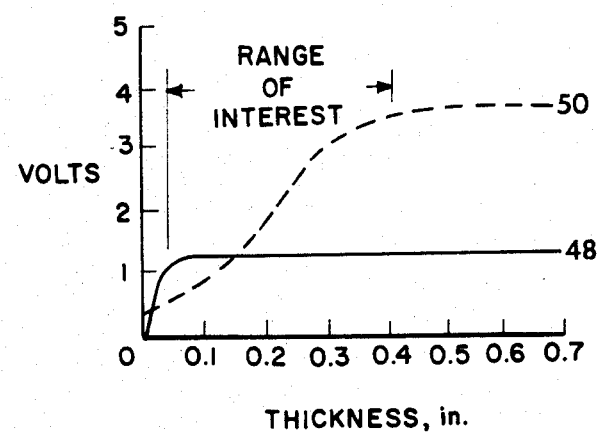
FIG. 5 is a graph showing the response of both the first and the second capacitive gauges in response to different thicknesses of ice. The curves scale to different levels for either different temperatures or different ice composition (impurity levels)

Referring now to FIG. 5, a graph of the output voltages from the first and second capacitance measuring circuits 24 and 26 for various thicknesses of ice 22 formed on outer surface 12 is shown. Curve 48 represents the voltage output $V_1$ from the first capacitance measuring circuit 24 at a fixed temperature and ice impurity level. Likewise, curve 50 represents the voltage output $V_2$ from the second capacitance measuring circuit 26. At the same fixed configurations, the curves 48 and 50 will vary with either a temperature change or an ice impurity change.

An indicated range of interest of ice thickness is shown in FIG. 5, in this embodiment approximately 0.04 of an inch to approximately 0.42 of an inch. This range of interest determines the sizes of both first capacitive gauge 16 and second capacitive gauge 18. The ice thickness at which the voltage output of a capacitance measuring circuit levels off for increasing ice thickness is directly related to the conductor separation for the particular geometry of a given capacitive gauge. First capacitive gauge 16 is selected so that the constant maximum of curve 48 is reached even for the minimum ice thickness of the range of interest. As noted previously, in this embodiment the electrodes 34 and 36 of first capacitive gauge 16 have gaps of approximately 0.012 of an inch between them. Second capacitive gauge 18 is selected so that the constant maximum of curve 50 does not occur before the maximum ice thickness of the range of interest. As noted previously, in this embodiment the two leads 38 and 40 of second capacitive gauge 18 have a length of approximately two inches and a electrode which covers approximately one-third of the distance between the outer edges 0.67 of an inch. The space between the electrodes is also 0.67 of an inch.

It is apparent from FIG. 5 that curves 48 and 50 do not go to zero output voltage when the ice thickness is zero. This is due to cable and dry gauge capacitance of first and second capacitive gauges 16 and 18 when no ice 22 is present on outer surface 12. In order to determine the correct output voltage readings for first and second capacitive gauges 16 and 18, it is necessary to subtract an initial voltage output reading $V_o$ obtained from each gauge under no ice conditions.

Referring once again to FIG. 1, first capacitance measuring circuit 24 and second capacitance measuring circuit 26 are connected to offset and dividing circuit 29. The output voltage $V_{out}$ of this offset and dividing circuit 29 for ice conditions is determined by the following equation:

$$V_{out} = \frac{(V - V_o)_2}{(V - V_o)_1} \quad (1)$$

where V is the voltage output for ice conditions and $V_o$ is the initial voltage output for no ice conditions. Subscripts 1 and 2 refer respectively to readings from first capacitance measuring circuit 24 and second capacitance measuring circuit 26. $V_{out}$ is independent of both temperature and ice composition since both effects result in identical scaling factors for both $(V-V_o)2$ and $(V-V_o)_1$, thereby resulting in no change in Equation (1).

First and second capacitance measuring circuits 24 and 26 are sensitive to the presence of water as well as ice 22. Use of temperature measuring circuit 28 ensures that ice 22 rather than water on outer surface 12 is being detected. Temperature measuring circuit 28 determines whether the surface is above or below the freezing point. By logically combining the outputs of the measuring circuit 28, a logic circuit (not shown) can determine when ice 22 is present on outer surface 12. Specifically, when the output of the offset and dividing circuit 29 indicates that moisture is present and when the output of the temperature measuring circuit 28 indicates that the temperature is below the freezing point, ice 22 is present.

In operation, the response of the first and second capacitive gauges 24 and 26 are based on the following explanation. Most insulating solid materials such as plastic or epoxy have dielectric constants of about 3 to 5. Pure water and ice have dielectric constants near 80. Thus, if first and second capacitive gauges 24 and 26 are embedded near the surface of the insulating material 14, and if a layer of pure water or ice covers a surface, the capacitance between the electrodes will be strongly influenced by the proximity of the high dielectric water or ice. The particular influence will depend on the geometry of the electrodes and is also changed depending on the conductivity of the water. This difference in influence is seen in FIG. 5. Thus, in the first capacitive gauge 16 having small conductors and a small gap, there is a very large change in signal for a very small thickness of water on ice. In the second capacitive gauge 18 having large electrodes and a relatively large gap, the response to the presence of ice varies nearly linearly with thickness.

Figure 6:
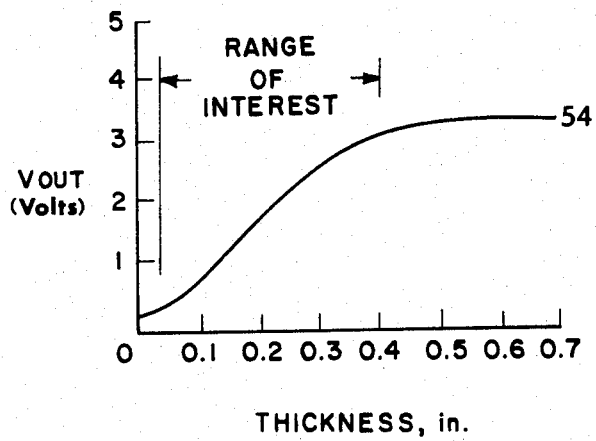
FIG. 6 is a graph showing the response of the ratio of the second capacitive gauge to the first capacitive gauge in response to different thicknesses of ice. This curve is not a function of either temperature or composition.

Thus, when a logic circuit (not shown) receives an output from the offset and dividing circuit 29 indicating that moisture is present and at the same time receives an indication from the temperature measuring circuit 28 that the temperature is below the freezing point, an indication of the presence of ice is indicated. In order to determine the thickness of the ice, the output voltage $V_{out}$ from the offset and dividing circuit 29 is used. Referring now to FIG. 6, the thickness of the ice may be determined easily since it follows the simple, almost linear curve 54. Thus, by merely determining the output voltage $V_{out}$, the thickness of the ice 22 is easily determined. The indication of the presence of the ice and the thickness of the ice may be displayed to the pilot and may also activate devices to remove the ice 22, such as heaters (not shown).

While the description above has been given in terms of surfaces on an aircraft, it is clear that the device could be equally well used on other surfaces subject to accumulation of ice. Thus, it could be used for removing ice from sidewalks, buildings, other vehicles, etc.

Although the gauges and other circuitry have been described as individual elements, it is clear that they could equally well be formed into a single integrated circuit in order to reduce the complexity and increase the reliability of the device.

Obviously, numerous additional modifications and variations of the present invention are possible in light of the above teachings. It is therefore understood that within the scope of the appended claims, the invention may be practiced otherwise than as specifically described herein.

What is claimed is:

1. A device for determining the thickness of ice on an outer surface of an object independently of both temperature and ice composition comprising:
    a first capacitance measuring circuit which produces an output voltage and is located within said object;
    a first capacitive gauge which is connected to said first capacitance measuring circuit and whose electrode size is selected so that the output voltage of said first capacitance measuring circuit reaches a constant maximum for the minimum ice thickness desired to be determined;
    a second capacitance measuring circuit which produces an output voltage and is located within said object;
    a second capacitive gauge which is connected to said second capacitance measuring circuit and whose electrode size is selected so that the output voltage of said second capacitance measuring circuit reaches a constant maximum from the maximum ice thickness desired to be determined;
    a temperature measuring circuit which produces an output voltage and is located within said object;
    a temperature gauge which is connected to said temperature measuring circuit and is sensitive to a temperature of 0° C.;
    a means for embedding said first capacitive gauge, second capacitive gauge, and said temperature gauge slightly below said outer surface such that no irregularities result in contours of said outer surface and such that said gauges may sense conditions on said outer surface:
    an offset and dividing circuit to which said first and second capacitance measuring circuits are connected and which produces a voltage output $V_{out}$ proportional to the thickness of ice present according to the following equation:

$$V_{out} = \frac{(V - V_o)_2}{(V - V_o)_1}$$

where $V_1$ and $V_2$ are the respective voltage outputs of said first and second capacitance measuring circuits when ice is present, and $V_{o1}$ and $V_{o2}$ are the respective voltage outputs of said first and second capacitance measuring circuits when no ice is present.

2. The device of claim 1 wherein said offset and dividing circuit and said temperature measuring circuit are connected to a logic circuit which alerts either a human operator or heating units when ice is present on said outer surface.

3. The device of claim 1 wherein said first capacitive gauge comprises two leads parallel to one another, with each lead having electrodes extending perpendicularly from said lead such that the electrodes of one lead are interleaved with but do not touch the electrodes of the other.

4. The device of claim 1 wherein said second capacitance gauge comprises two parallel leads which form a single electrode.

5. The device of claim 1 wherein said means for embedding comprises an embedding material which is placed in a hollowed out portion of said outer surface and smoothed with contours of said outer surface.

6. The device of claim 5 wherein said embedding material is a plastic.

7. The device of claim 5 wherein said embedding material is an epoxy.

8. A method for determining the thickness of ice on an outer surface of an object independently of both temperature and ice composition comprising:

- providing a first capacitance measuring circuit which produces an output voltage and is located within said object;
- providing a first capacitive gauge which is connected to said first capacitance measuring circuit and whose electrode size is selected so that the output voltage of said first capacitance measuring circuit reaches a constant maximum for the minimum ice thickness desired to be determined;
- providing a second capacitance measuring circuit which produces an output voltage and is located within said object;
- providing a second capacitive gauge which is connected to said second capacitance measuring circuit and whose electrode size is selected so that the output voltage of said second capacitance measuring circuit reaches a constant maximum from the maximum ice thickness desired to be determined;
- providing a temperature measuring circuit which produces an output voltage and is located within said object;
- providing a temperature gauge which is connected to said temperature measuring circuit and is sensitive to a temperature of 0° C.;
- embedding said first capacitive gauge, second capacitive gauge, and said temperature gauge slightly below said outer surface such that no irregularities result in contours of said outer surface, and so that said gauges may sense conditions on said outer surface;
- providing an offset and dividing circuit to which said first and second capacitance measuring circuits are connected;
- obtaining a voltage output $V_{out}$ from said offset and dividing circuit which is proportional to the thickness of the ice on said outer surface according to the following equation:

$$V_{out} = \frac{(V - V_o)_2}{(V - V_o)_1}$$

where $V_1$ and $V_2$ are the respective voltage outputs of said first and second capacitance measuring circuits when ice is present, and $V_{o1}$ and $V_{o2}$ are the respective voltage outputs of said first and second capacitance measuring circuits when no ice is present.

* * * * *